United States Patent [19]

Raudys et al.

[11] 4,017,941
[45] Apr. 19, 1977

[54] CASING SENSING MEANS FOR STUFFING APPARATUS

[75] Inventors: Vytas Andrew Raudys, Chicago; Anton Leroy Mika, Downers Grove, both of Ill.

[73] Assignee: Union Carbide Corporation, New York, N.Y.

[22] Filed: Oct. 30, 1975

[21] Appl. No.: 627,254

[52] U.S. Cl. ..................................... 17/41; 17/49
[51] Int. Cl.² ......................................... A22C 11/02
[58] Field of Search ............ 17/33, 34, 35, 41, 49

[56] References Cited
UNITED STATES PATENTS

| 3,659,317 | 5/1972 | Kupcikevicius | 17/41 |
|---|---|---|---|
| 3,860,996 | 1/1975 | Kupcikevicius et al. | 17/49 |

*Primary Examiner*—Louis G. Mancene
*Assistant Examiner*—James D. Hamilton
*Attorney, Agent, or Firm*—Cornelius F. O'Brien

[57] ABSTRACT

In an apparatus for stuffing flowable product into a shirred tubing disposed on a stuffing horn to produce stuffed tubular articles of predesired length on a continuous basis, a sensing member is employed for detecting movement of the trailing end portion of the shirred tubing on the stuffing horn which activates control for interrupting the stuffing operation of the apparatus so as to terminate the flow of product from the stuffing horn before the shirred tubing is completely expended.

29 Claims, 17 Drawing Figures

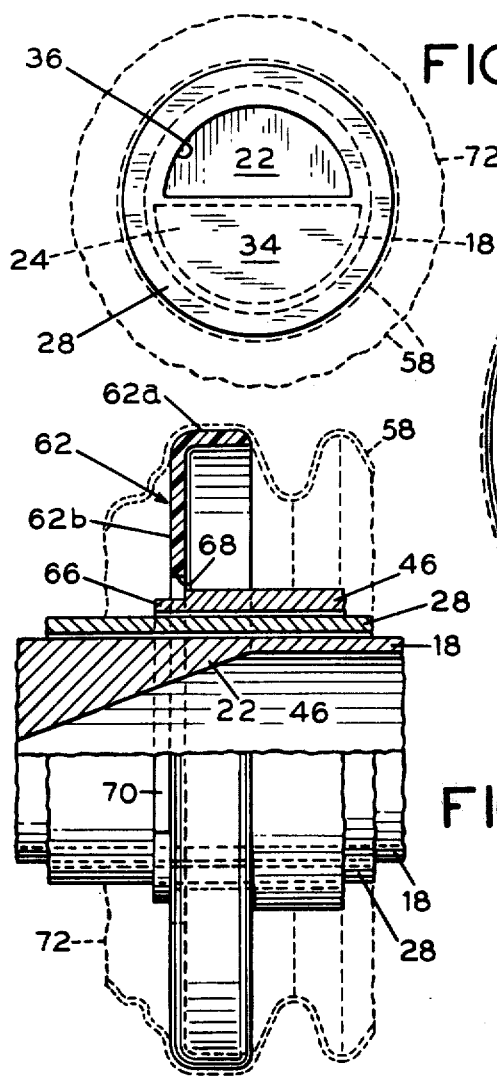
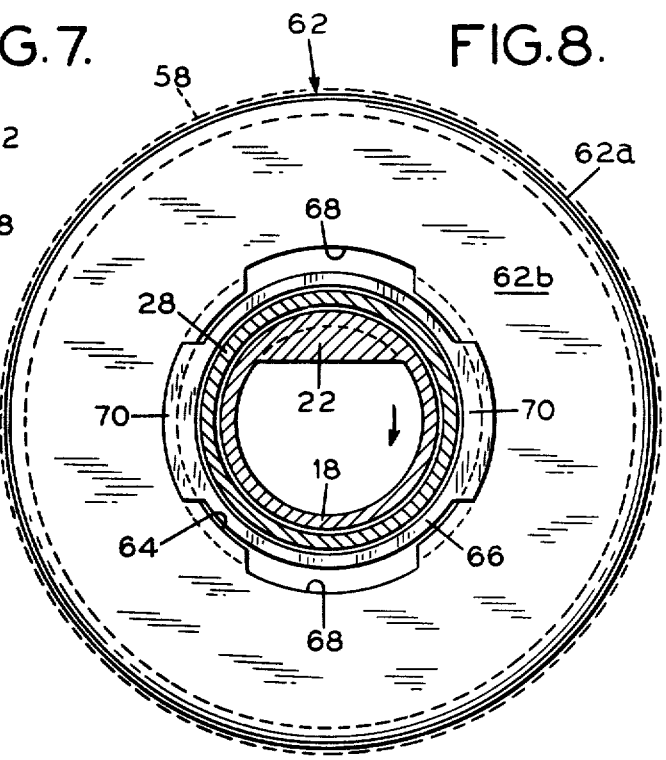
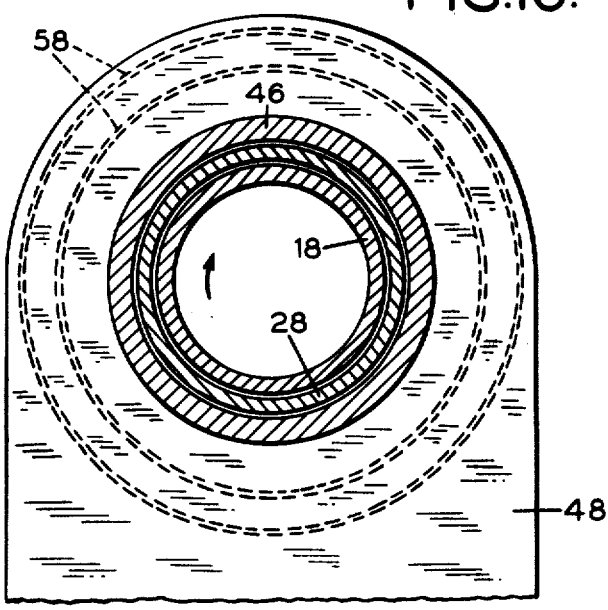
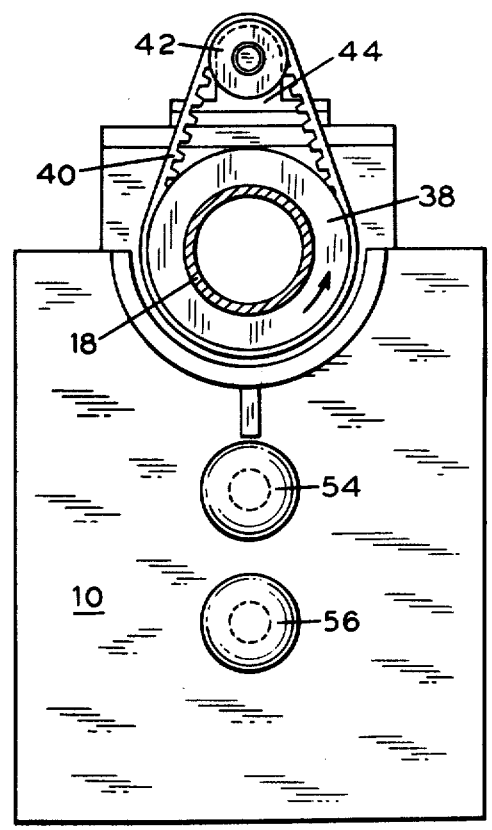

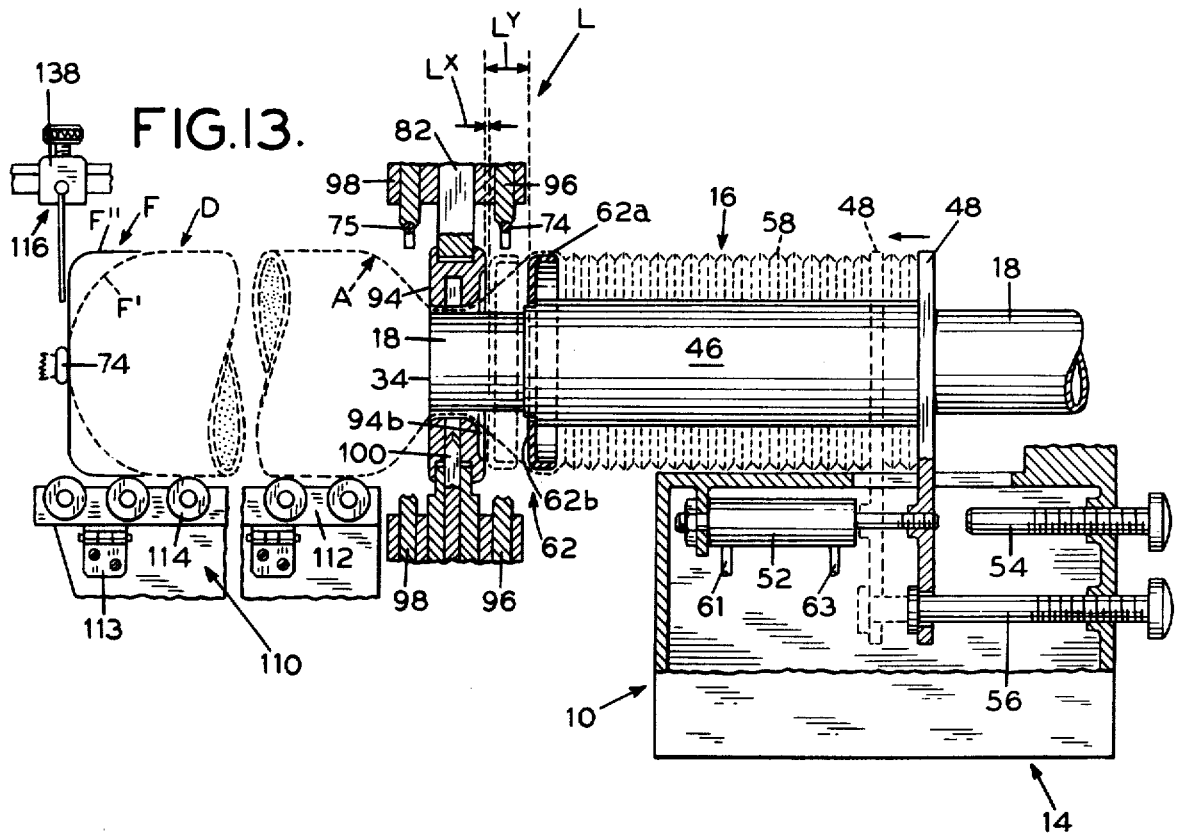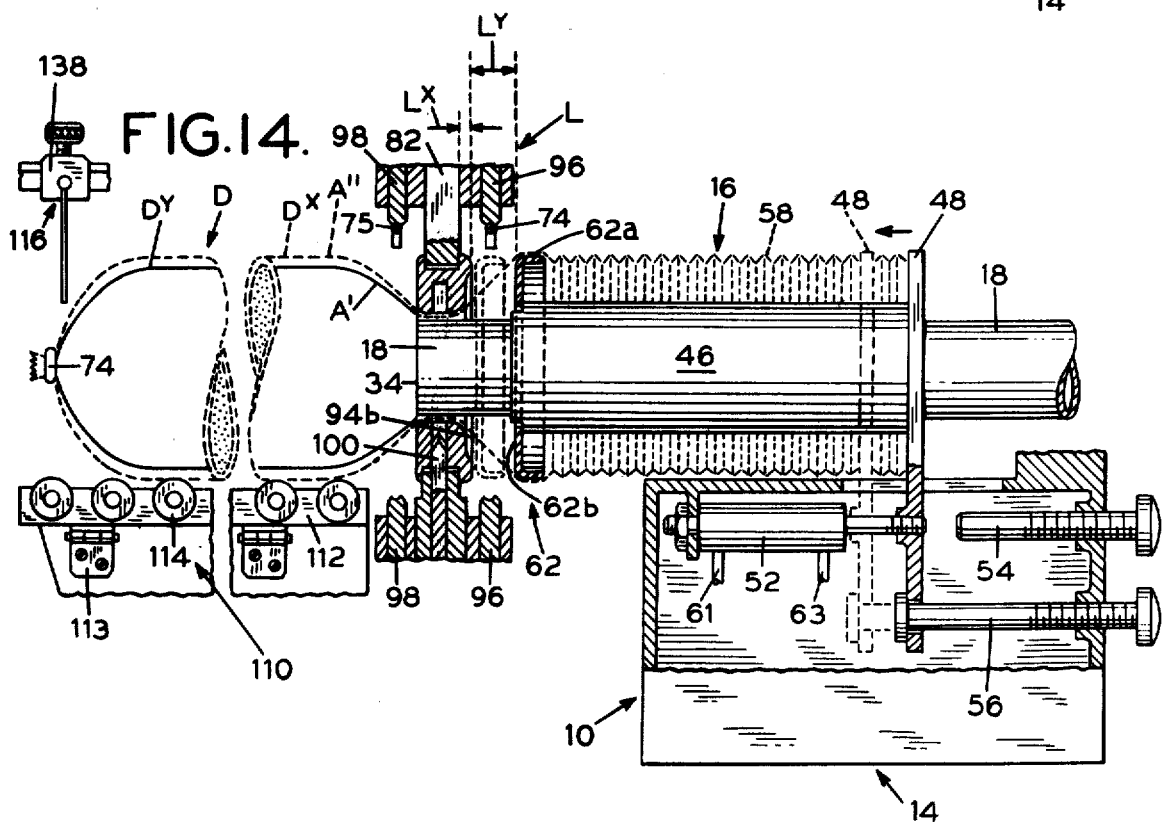

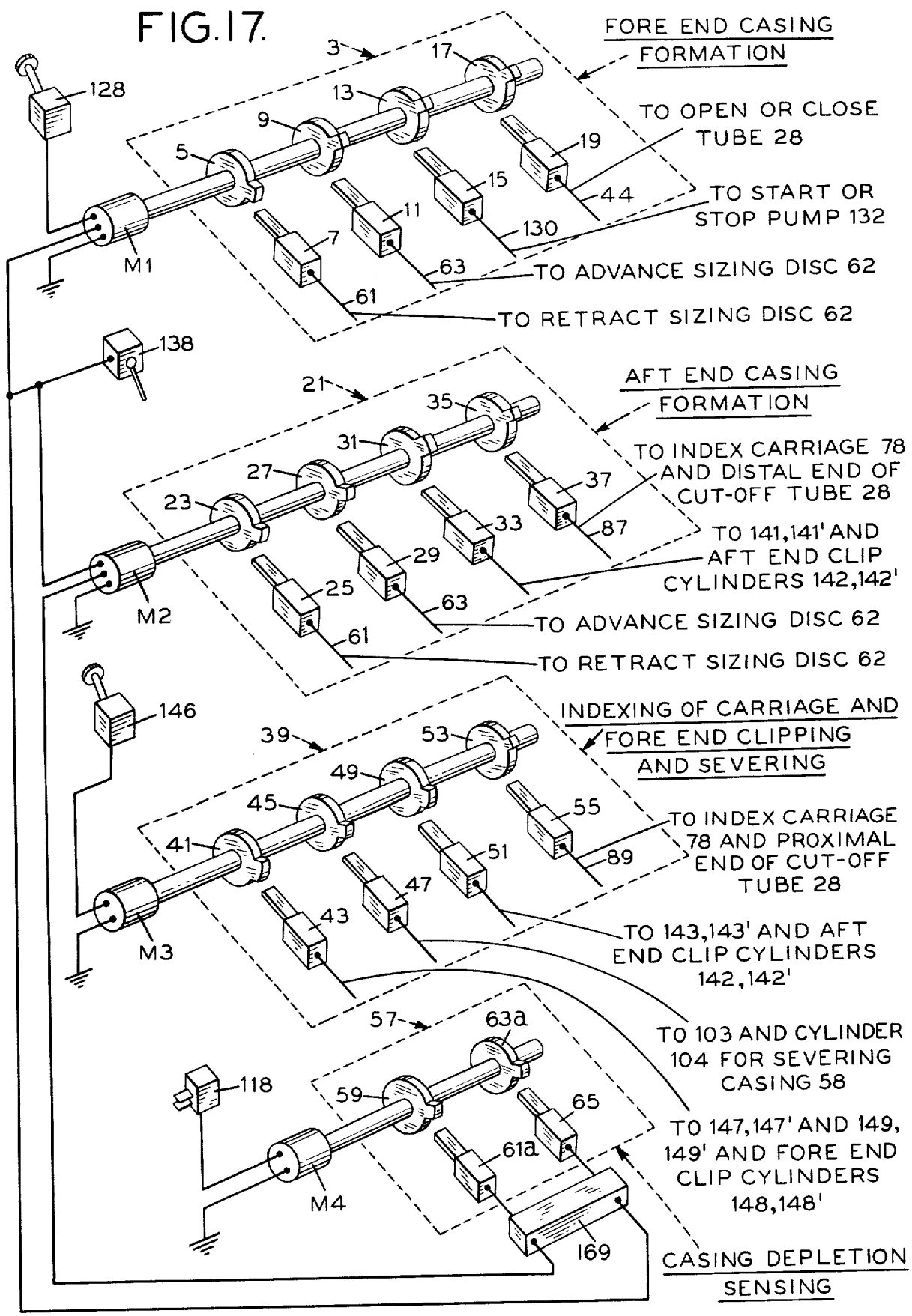

CASING SENSING MEANS FOR STUFFING APPARATUS

FIELD OF THE INVENTION

The present invention relates to sensing means for use on an apparatus for stuffing a flowable mass of materials, such as food emulsions, into flexible tubing to produce preselected size stuffed articles on a continuous basis. The sensing means, upon detecting movement of the trailing end portion of the shirred tubing, activates control means for interrupting the stuffing operation of the apparatus so as to terminate the flow of material to the shirred tubing being completely expended.

BACKGROUND OF THE INVENTION

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing the deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are also known to persons familiar with the art as "sticks", such "sticks" being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation No. 6 (101 mm. diameter) to No. 9 (129 mm. diameter). In the production of large sausage products, a clip closed end casing of precut length is first manually sheathed over the end of a stuffing horn and then stuffed with a food emulsion. The stuffed casing is then tied, twisted or clipped into predetermined unit length cylindrical packages.

The thusly stuffed and encased food emulsion is subsequently cooked and cured according to conventional processes. A large percentage of these large sausage products are thereafter sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially, is to have a large sausage casing stuffed with uniform tight ends, to thereby mimimize the amount of food product cut off from the cylindrical portion.

Years of commercial utilization of manufactured sausage casings such as prepared from unsupported or fibrous reinforced cellulose have provided the experience for determining optimum stuffing and processing conditions for various classes of sausage product. Sausage generally needs to be encased or stuffed to "green" or unprocessed diameters that have been selected and recommended for such optimum performance. The recommended stuffing diameter for each size and type of casing has been established and tabulated in recommended operating procedures determined by the casing manufacturer for guidance of the sausage maker.

When a casing is understuffed from the recommended "green" diameter, the result generally is a processed product that is not uniform in diameter from end to end and from piece to piece; the product is undesirably wrinkled in appearance; and the processed sausage may have an emulsion breakdown yielding undesirable pockets of fat or liquid.

When a casing is overstuffed from the recommended "green" diameter, the casing may split or break apart at the stuffing station or subsequently, in transport to or in the cooking/smoking processing operations. This results in a costly waste of meat and in the labor expense for cleanup.

For many years, the apparatus and methods employed to prepare the encased food products and particularly food products encased in large diameter casing have relied upon manual manipulation in controlling the stuffing of food emulsion into predetermined length sausage links or packages. Recently, advances in the art have resulted in the introduction of apparatus for machine control of the stuffing operation which have provided means for preparing uniformly sized encased products such as disclosed, for example, in U.S. Pat. Nos. 2,871,508, 2,999,270, 3,264,679 3,317,950, 3,454,980, 3,457,588, 3,553,769, 3,621,513, 3,659,317 and 3,751,764.

Although many of the prior art stuffing devices generally provide a fairly wide range of adjustment for producing stuffed casings of desired diameter, the adjustments are usually left to the judgment of the operator, thereby resulting in understuffing or overstuffing caused by deviation from the optimum size recommended by the casing manufacturer. In addition, the prior art devices do not have means for controlling the shape and tightness of stuffing for both the leading and trailing ends of the stuffed casing. However, in U.S.

application Ser. No. 627,252 filed Oct. 30, 1975 in the name of V. Kupcikevicius et al., filed concurrently with this application, an apparatus is disclosed for stuffing flowable product into a shirred tubular casing article containing a diameter sizing means confined within a deshirred portion of one closed end and containing means to automatically stretch and snub a casing to a predetermined diameter as it is being suffed and having control means regulating the shape for the fore end and the aft end portions of a clip closed stuffed product. The specific details of this automatic stuffing apparatus are disclosed in said application and are incorporated herein by reference.

U.S. Pat. No. 3,975,795 filed in the name of V. Kupcikevicius et al. On Jan. 20, 1975 discloses an apparatus for stuffing cold, viscous product into normally flexible film tubing to produce stuffed tubular products on a continuous basis having a preselected length and diameter. The details of the the construction of this apparatus are disclosed in said application and are incorporated herein by reference.

One disadvantage of the prior art devices for stuffing tubular articles on a continuous basis is that an operator has to remain at the stuffing site to be ready to terminate the stuffing operation just prior to runout of the shirred casing. If the product flow control is not terminated, viscous material will be dispersed from the outlet end of the feed horn all over the apparatus, thereby not only causing waste of the material but also the expenditure of time for a cleanup operation before the stuffing cycle can be repeated. In addition, even when the operator terminates the cycle in time to prevent material from being dispersed over the machinery, he may not terminate the stuffing cycle upon completion of a fully stuffed link which thereby will result in a partially stuffed final link. This partially stuffed link can either be discarded, thereby wasting the material, or by expending time the material can be extracted from the casing for reuse.

It is, therefore, an object of this invention to provide a sensing means for automatically detecting the trailing portion of a shirred tubing on a stuffing horn assembly of a stuffing apparatus which will activate means for terminating the flow of material through said horn prior to the shirred casing being expended.

Another object of this invention is to provide sensing and control means for use on a stuffing apparatus to maximize the efficient use of shirred casings to be used on said apparatus.

A further object of this invention is to provide sensing means for automatically terminating the stuffing operation of a stuffing apparatus when the shirred tubing remaining on the stuffing horn of said apparatus is insufficient to provide a desired length of stuffed product.

Still another object of this invention is to provide a method whereby the detecting of movement of the trailing portion of a shirred casing disposed on a stuffing horn will automatically result in terminating the flow of material through said horn thereby terminating said flow prior to an expenditure of the shirred casing.

SUMMARY OF THE INVENTION

The invention broadly relates to an improvement in an apparatus for stuffing flowable product into shirred casing (tubing), said apparatus comprising a stuffing horn assembly adapted for mounting a shirred tubular casing, and including a tube having an inlet end for receiving flowable product from a pressurized supply and a discharge end for discharging the product; product stoppering means adapted to be indexed to a first position so as to allow the passage of pressurized product out through the discharge end of the tube into a mounted shirred casing and adapted to be indexed to a second position so as to prevent the flow of pressurized product out through said discharge end of the tube; means associated with said stuffing horn assembly and adapted for providing a closure after a selected length of tubing is stuffed; and first control means for automatically providing consecutive cycles of a stuffing and closing operation for producing stuffed products of a desired length; the improvement comprising sensing means adapted to detect movement of a trailing end portion of a mounted shirred casing, and second control means associated with said sensing means for interrupting the stuffing and closing operation so as to terminate the flow of product from the tube before the mounted shirred casing is completely expended.

Through the use of the above closure means, a continuous link-connected product can be produced. In addition, a closure and severing means can be arranged for providing a closure at an aft end of a length of stuffed tubing, a closure at the fore end of the succeeding trailing unfilled tubing thereof and severing the tubing intermediate the aft and fore end closures so that by employing control means as disclosed in U.S. application Ser. No. 627,252, filed concurrently herewith and identified above, a continuous cycle of stuffing, closing and severing can be automatically provided for producing individual stuffed products of a desired length. The sensing means and control means of this invention can then be used for interrupting the stuffing, closing and severing operation upon detecting movement of the trailing end portion of the shirred tubing being filled so as to terminate the flow of product from the tube before the shirred tubing is completely expended.

The sensing means for use in accordance with this invention can be disposed so as to sense movement of the trailing end of the shirred casing or it can be positioned to sense movement of the casing a predetermined distance upstream of the trailing end. The exact sensing position will depend partly on the predetermined length of the stuffed product to be produced. For example, if the length of the product to be produced is longer than the length of the tube on which the shirred casing is assembled and if only those length products are desired, then the sensing means can be disposed to detect movement of the casing a fixed distance upstream of the trailing end so as to insure that the last fully stuffed product will be of proper predetermined size. In applications where it is desired to use effectively all of the casing, then a conventional timer can be coupled to the sensing means which could delay operation of the control means for interrupting the stuffing cycle until a fixed time has elapsed. For example, if the stuffing horn is 20 units long while the product being stuffed is 5 units long, and if the sensing means detects movement of the trailing end of the casing 20 units upstream of the stuffing horn, then the sensing means can be coupled to a timer which can be set to delay operation of the control means until about 15 units of the casing are stuffed. Thus the stuffing cycle can then be interrupted with only 5 units of the casing remaining on the stuffing horn. It is, therefore, apparent that by selectively positioning the sensing means with respect to the trailing portion of the casing, with or without the use of a timer, the control means can be triggered to terminate the flow of product from the stuffing tube before the shirred casing is completely expended, thus making efficient use of the casing to produce preselected size stuffed products.

Some of the above features of the apparatus for use in conjunction with the sensing means and control means of this invention are similar to the features of the stuffing apparatus disclosed in U.S. Pat. Nos. 3,621,513, 3,975,795 and 3,860,996 to Vytautus Kupcikevicius et al., and the concurrently filed application Ser. No. 627,252 to Vytautus Kupcikevicius et al. identified above.

In addition to these disclosures, additional product stoppering means suitable for use in this invention are as disclosed in U.S. Pat. Nos. 3,890,675 to Joseph Nausedas or 3,860,996 to Vytautus Kupcikevicius et al., both of which are assigned to the same assignee as the subject invention. The product stoppering means so disclosed in these applications is disposed longitudinally concentrically interiorly of a stuffing horn and adapted so as to be reciprocally movable inboard of the discharge end of said horn, via suitable means, between a first position in which the product stuffing flow proceeds through the stuffing horn and around the stoppering means into a casing, and a second position in which product stuffing flow is stoppered by plugging the discharge end of the stuffing horn.

The invention also relates to a method for automatically terminating the flow of product through a stuffing assembly prior to complete expenditure of a shirred tubing on said stuffing horn assembly which comprises:

a. sheathing a shirred tubing onto a horn of a stuffing horn assembly, said horn having an inlet end and a discharge end and the fore end of the tubing proximal the discharge end of the horn being closed;

b. deshirring the closed fore end of the tubing if required;

c. releasing a pressurized flowable product from the discharge end of said horn, thereby deshirring the tubing and progressively stuffing said tubing;

d. stopping the flow of pressurized material after a predetermined length of tubing has been stuffed;

e. advancing the stuffed tubing from the discharge end of said stuffing horn to a closure station if required;

f. applying a closure at the aft end of said stuffed tubing at the closure station;

g. repeating steps (c) to (g); and h. automatically sensing movement of the trailing end portion of the shirred tubing sheathed on the horn of the stuffing horn assembly and interrupting the steps (c) to (g), thereby terminating the flow of product from the discharge end of the horn before the shirred tubing is completely expended. For example, step (d) could be interrupted and thereby stopped while steps (e) through (f) could be continued to complete the last cycle.

Another method for automatically terminating the flow of product through a stuffing horn assembly prior to complete runout of shirred tubing on said stuffing horn assembly comprises:

a. sheathing a shirred tubing onto a horn of a stuffing horn assembly, said horn having an inlet end and a discharge end and the fore end of the tubing proximal the discharge end of the horn being closed;

b. deshirring the closed fore end of the tubing if required;

c. releasing a pressurized flowable product from the discharge end of said horn thereby deshirring the tubing and progressively stuffing said tubing;

d. stopping the flow of pressurized material after a predetermined length of tubing has been stuffed;

e. advancing the stuffed tubing from the discharge end of said stuffing horn to a closure station if required;

f. applying a closure at the aft end of said stuffed tubing at the closure station;

g. further advancing said stuffed tubing to position the trailing unfilled tubing at the closure station if required;

h. applying a closure at the fore end of the succeeding trailing unfilled tubing;

i. severing said stuffed closed end tubing intermediate said aft end closure and said fore end closure of the succeeding trailing unfilled tubing;

j. repeating steps (c) to (j); and k. automatically sensing movement of the trailing end portion or the shirred tubing on the horn of the stuffing horn assembly and interrupting the steps (c) to (j), thereby terminating the flow of product from the discharge end of the horn before the shirred tubing runs out. For example, step (d) could be interrupted and thereby stopped while steps (e) through (f), (h), or (i) could be continued to complete the final cycle.

The apparatus and method of the present invention will become apparent from the following description thereof when considered together with the accompanying drawing which is set forth as being exemplary of an embodiment of the present invention and is not intended, in any way, to be limitative thereof and wherein.

Figure 1:
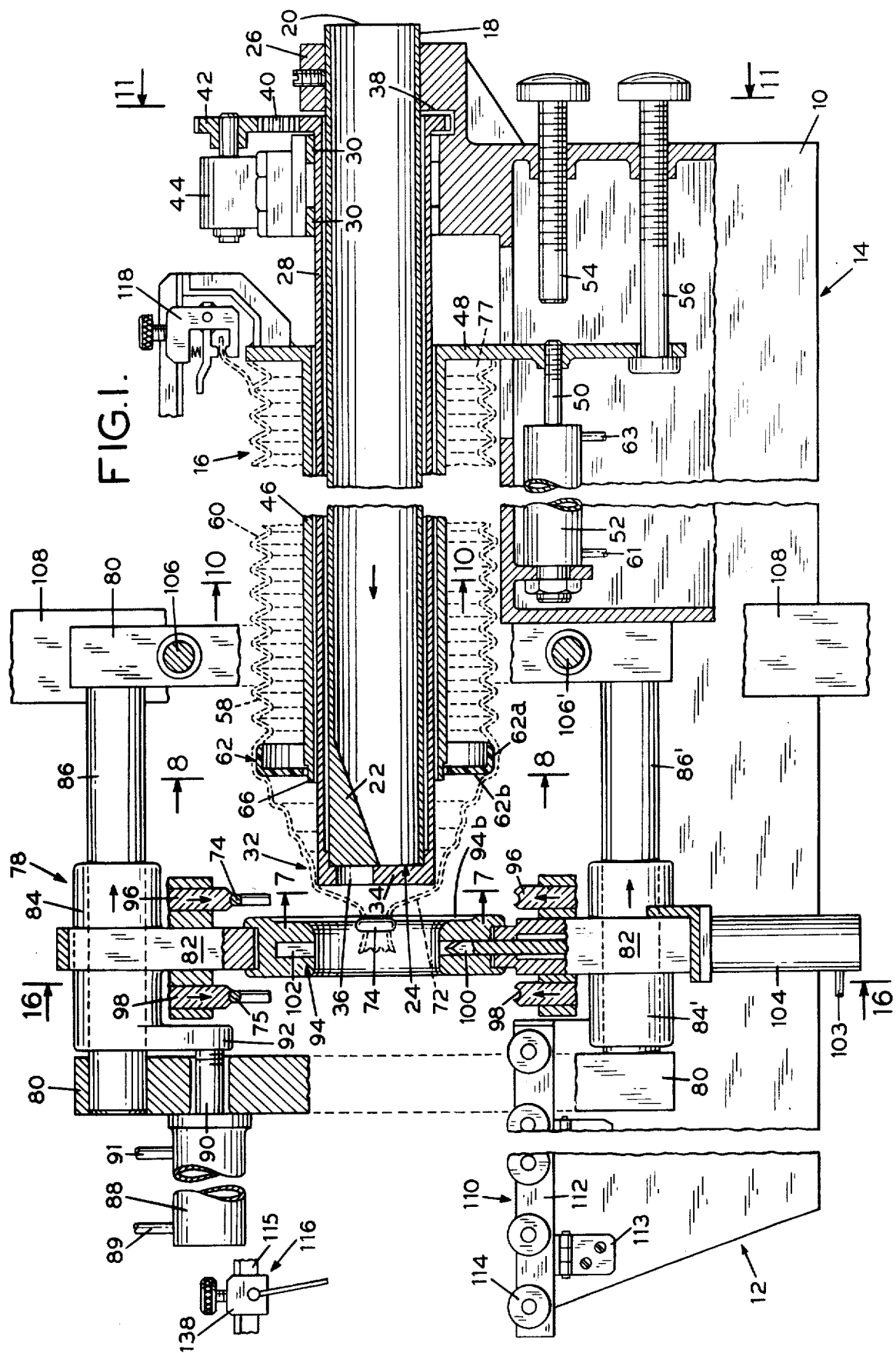
FIG. 1 is a side elevation view, partly in section, of one embodiment of an apparatus employing the sensing means of this invention.
Figure 3:
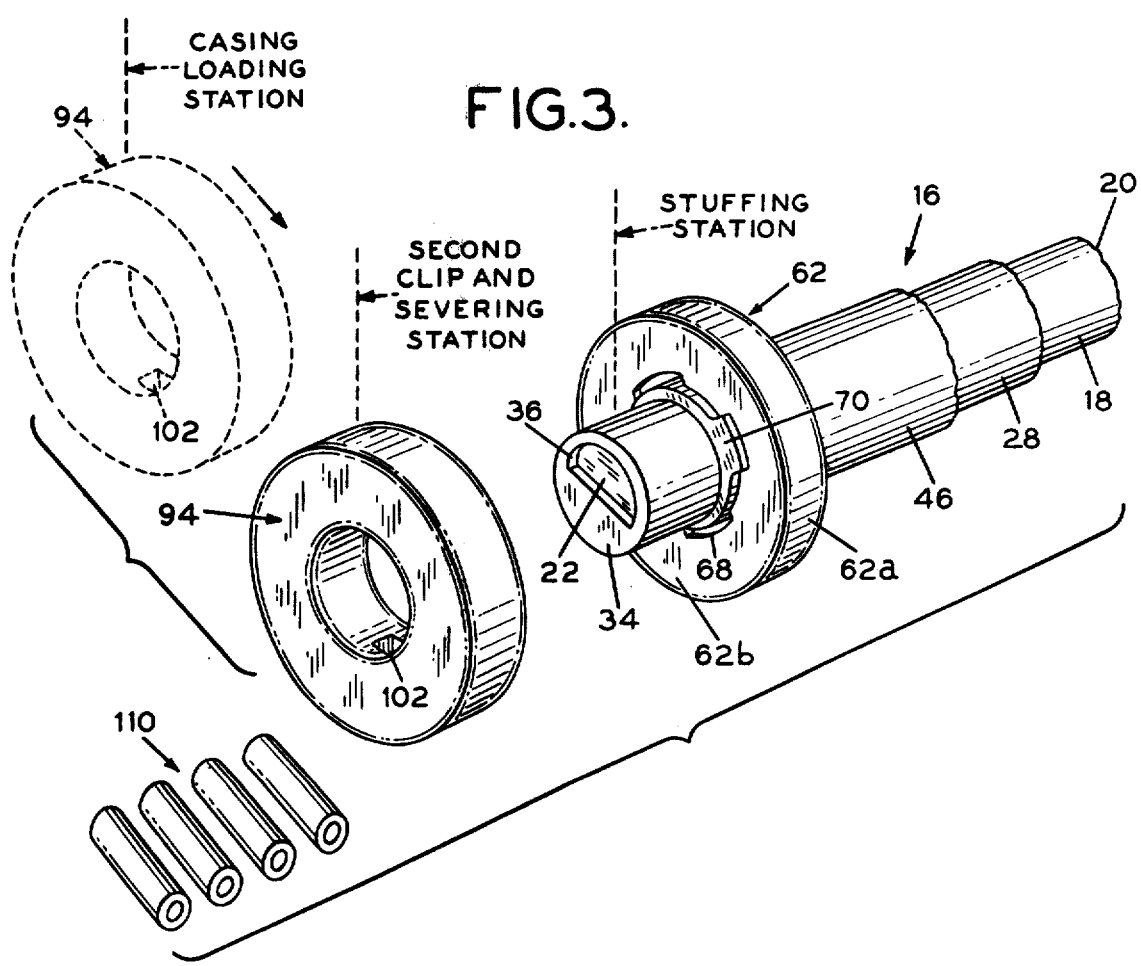
Figure 4:
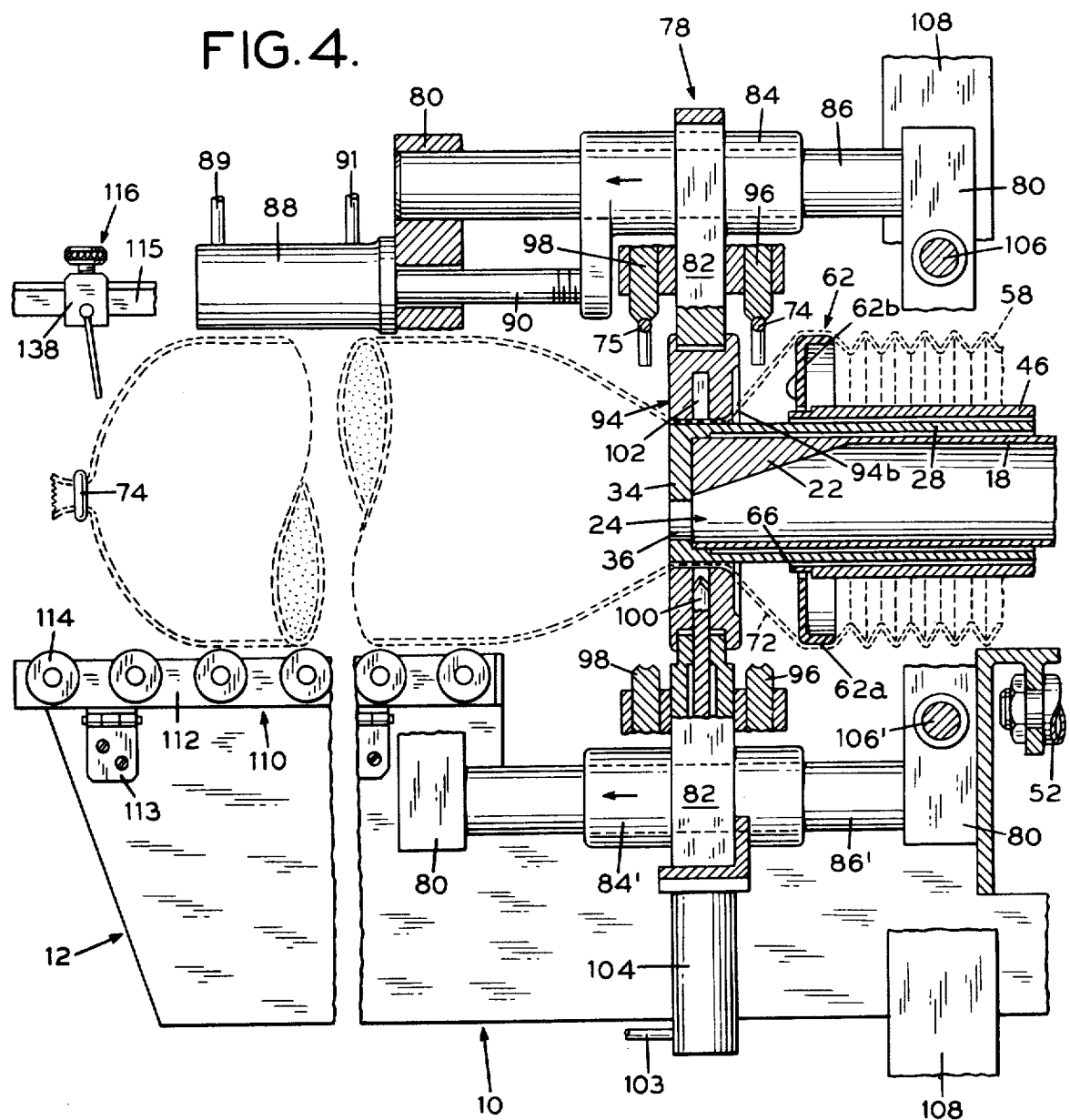
Figure 5:
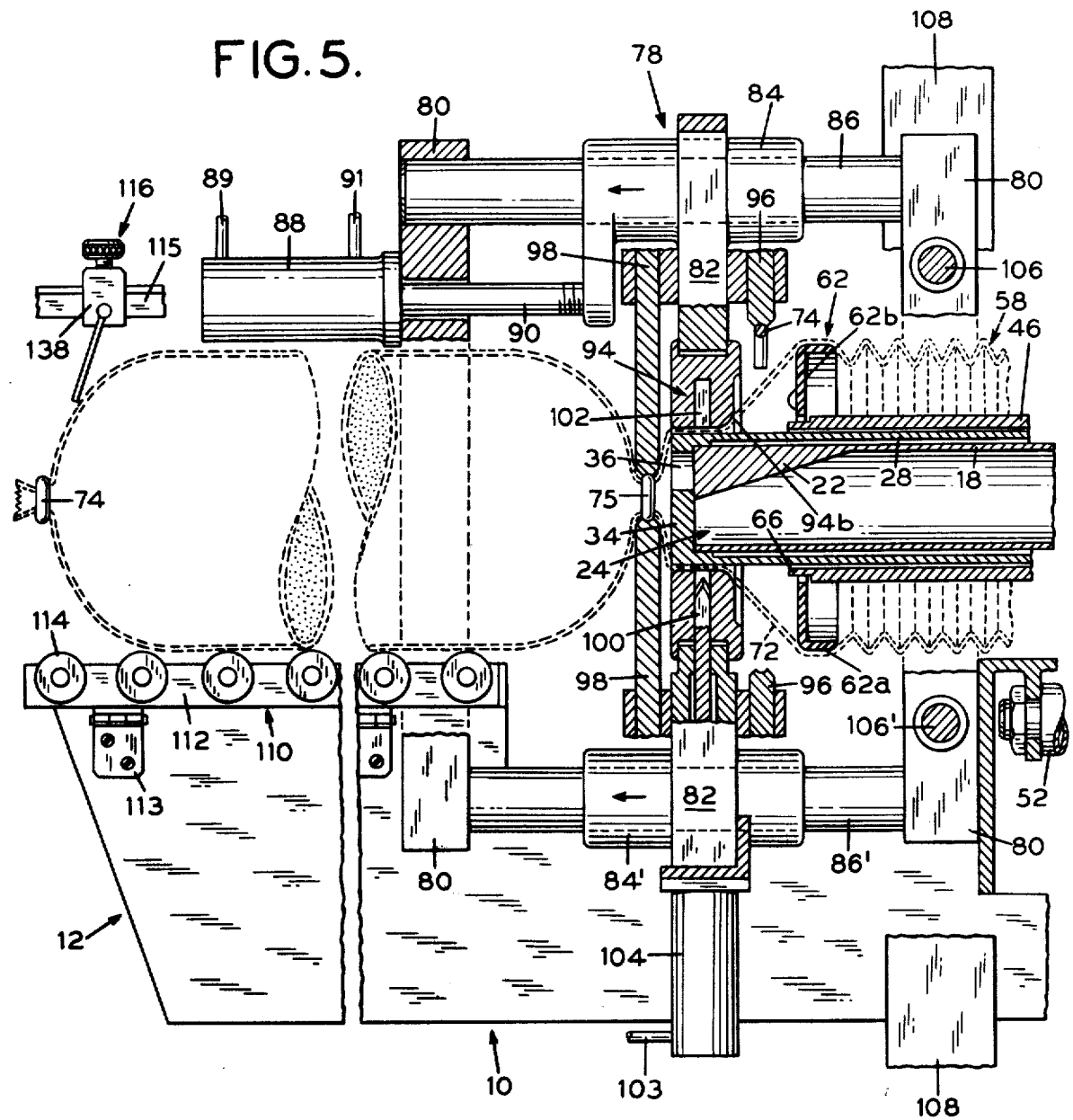
Figure 6:
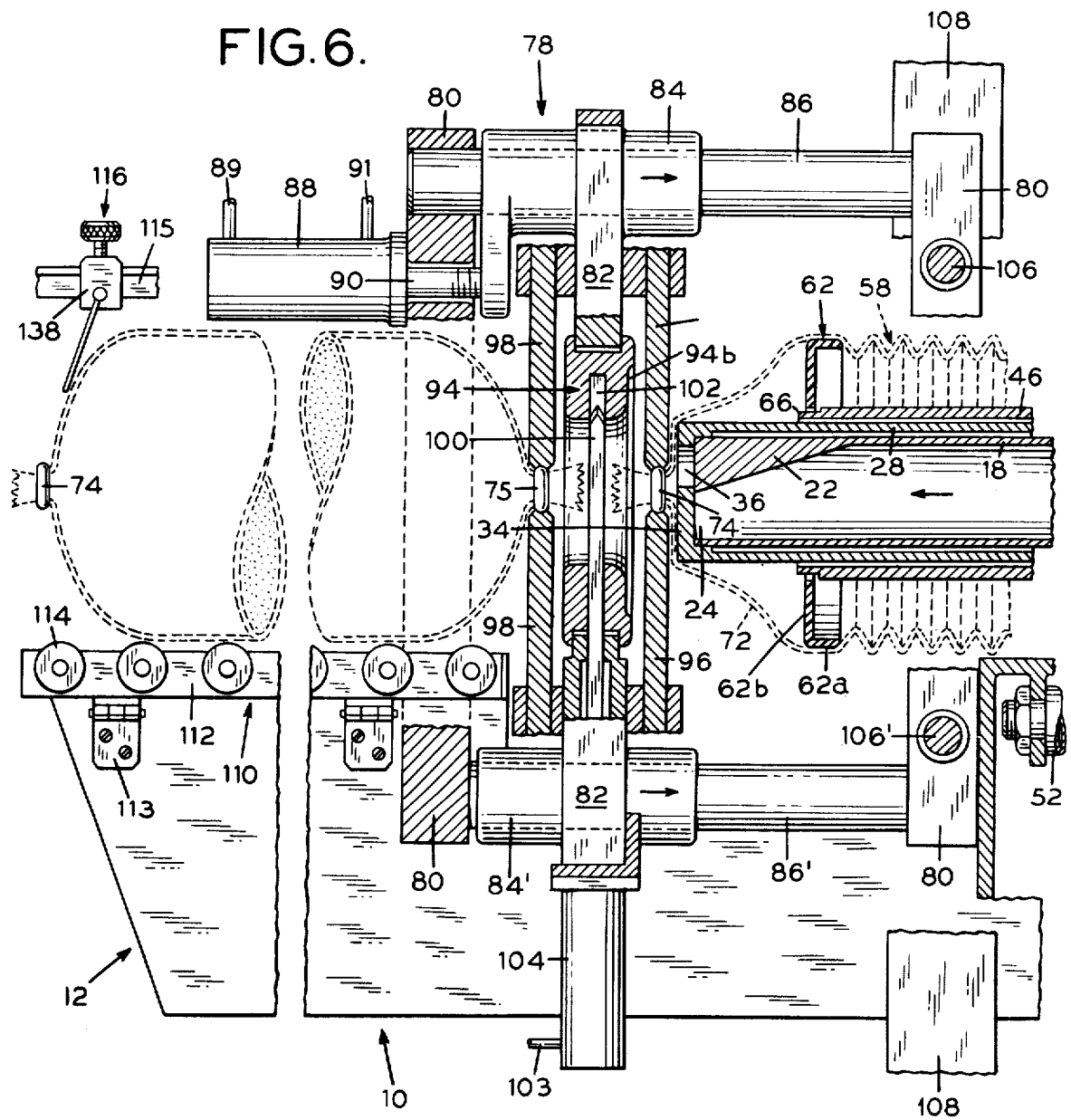
Figure 12:
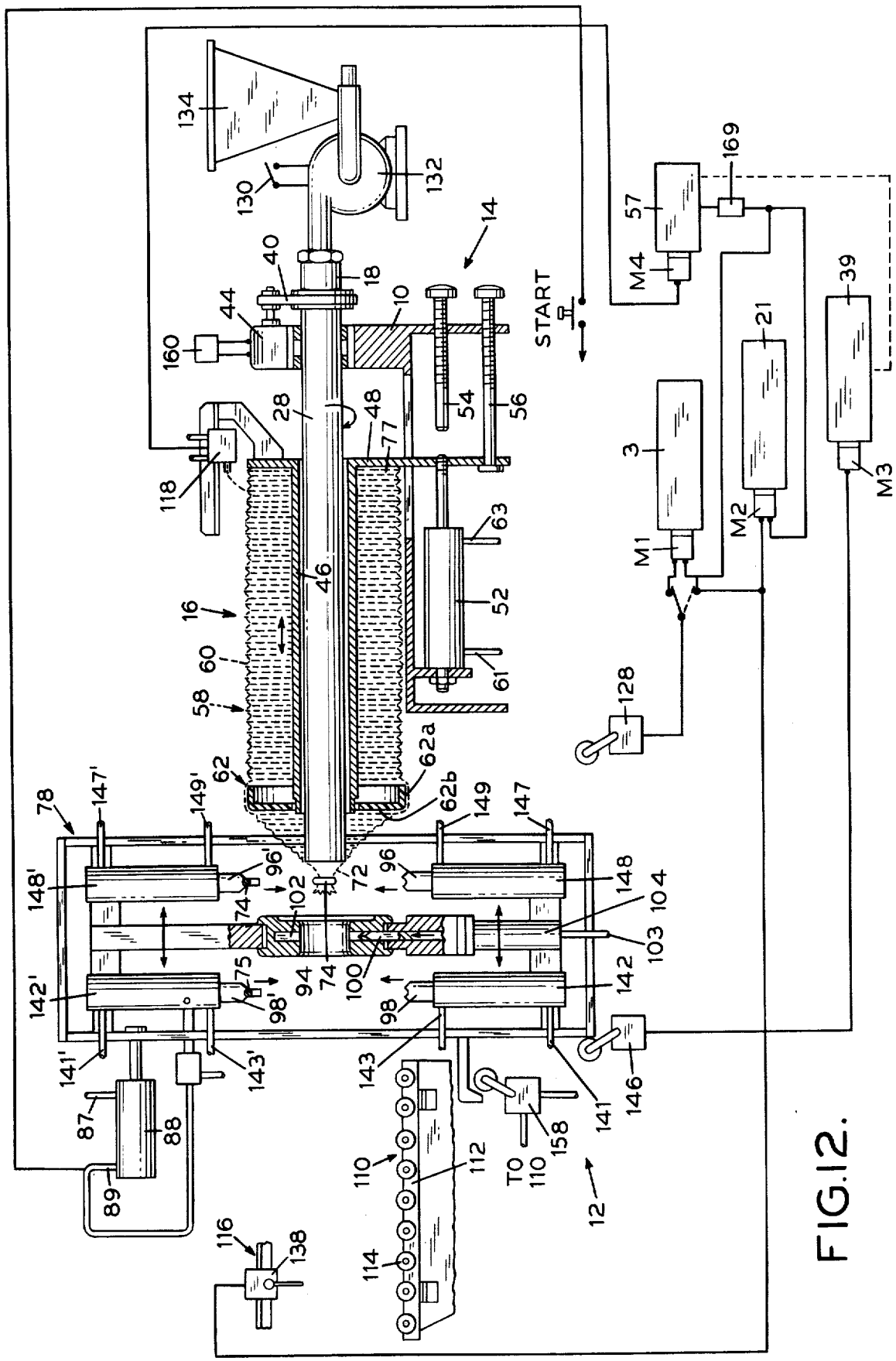
Figure 15:
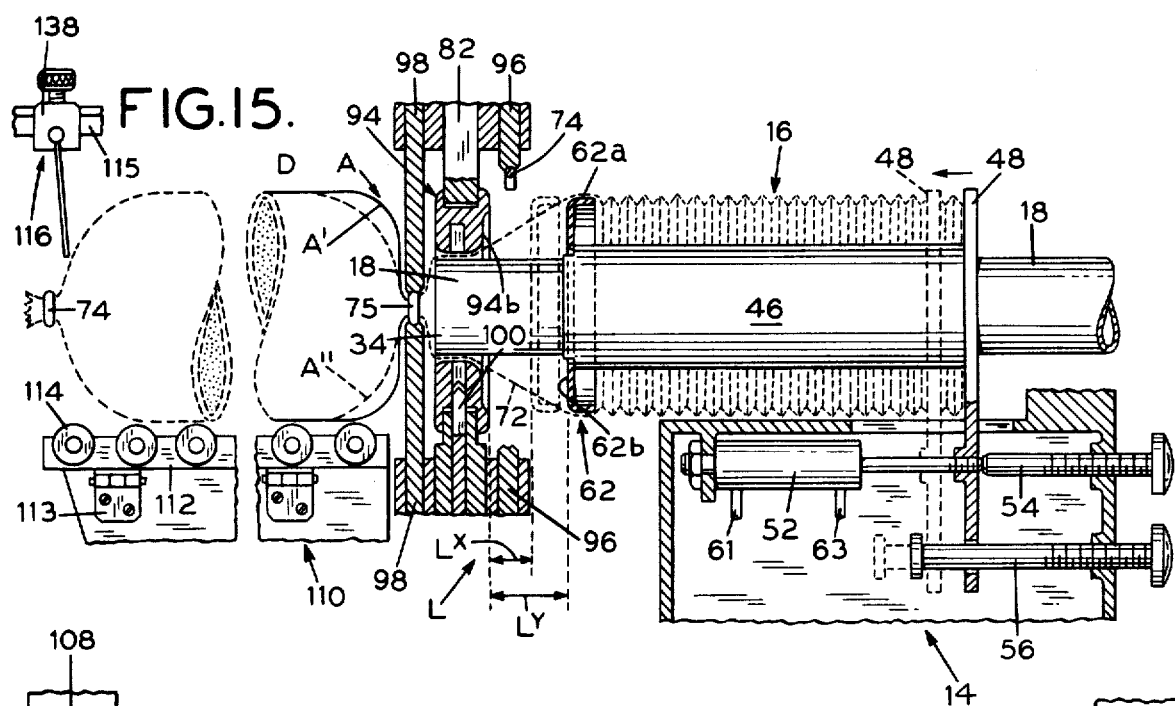
Figure 16:
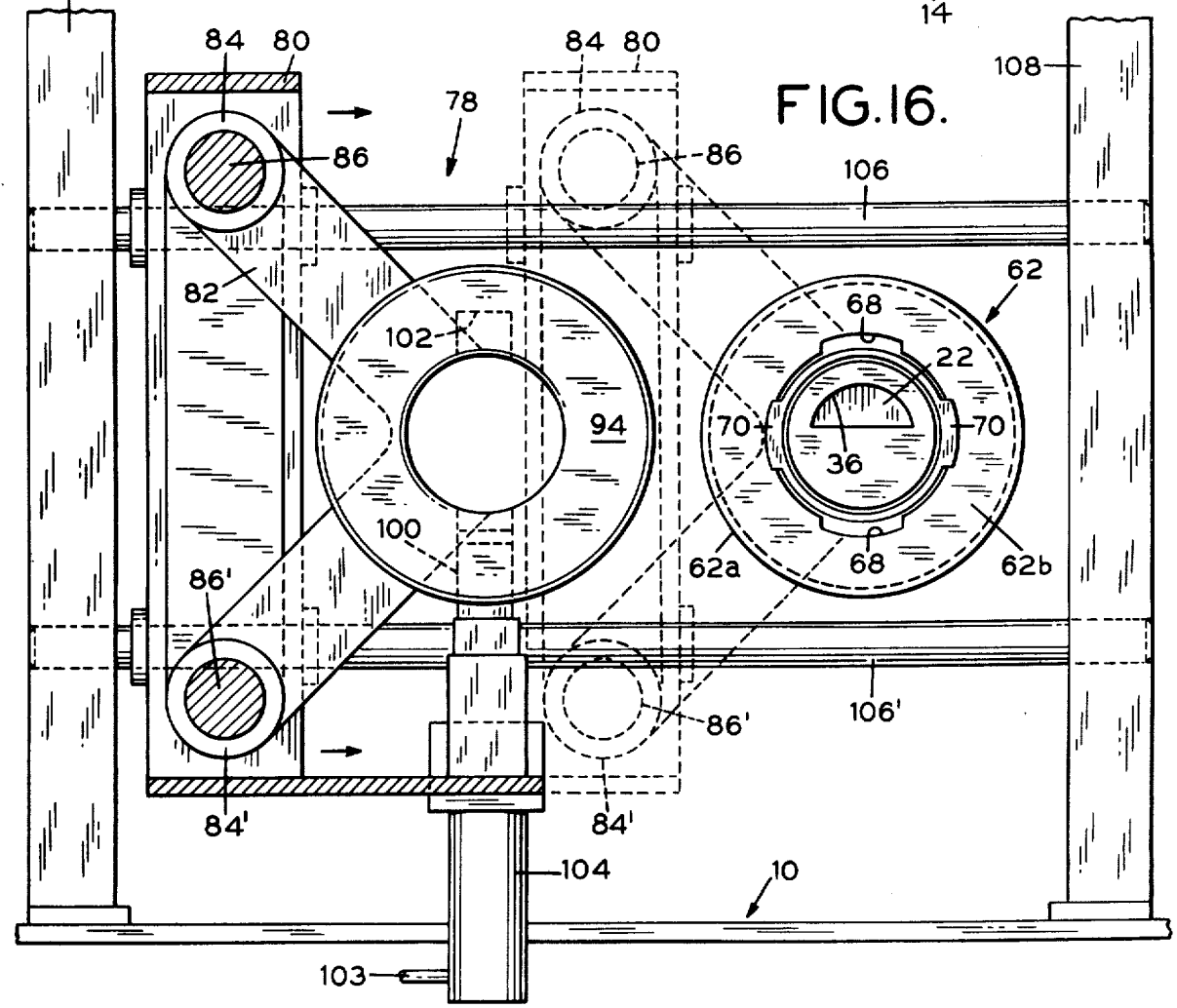

FIG. 3 is a exploded perspective view of portions of the apparatus of FIG. 1 showing portions of the product conveyor, snubbing means and the stuffing horn assembly, having portions of the stuffing horn assembly broken away to show the support sleeve, central support tube and emulsion cut-off tube, with the sizing disc secured to the support sleeve and showing the annular ring forming part of a snubbing carriage in phantom, retracted from and laterally displaced from the central support tube axis;

FIG. 4 shows the fore portion of the apparatus of FIG. 1 with similar parts identified with the same reference numbers showing the snubbing carriage axially aligned with and advanced over the discharge end of the central support tube, and the step of stuffing the casing substantially completed;

FIG. 5 shows the fore portion of the apparatus of FIG. 1 with similar parts identified with the same reference numbers showing the just stuffed casing advanced forward of the central support tube, and clip closure means applying a clip to the trailing end of the just filled casing;

FIG. 6 shows the fore portion of the apparatus of FIG. 1 with similar parts identified with the same reference numbers showing the clip closed stuffed casing length further advanced forward, the snubbing carriage being retracted from the stuffing horn assembly, a clip closure means having applied a clip to the leading end of the succeeding casing, and severing means effecting a cutting of the casing between the trailing and leading end clips, FIG. 7 is a vertical sectional view taken along the line 7—7 of FIG. 1 enlarged to show the emulsion cut-off means and the leading end of the deshirred casing;

FIG. 8 is a vertical sectional view taken along the line 8—8 of FIG. 1 enlarged to show the casing sizing disc secured on the support sleeve coaxially journaled on the emulsion cut-off tube and the central support tube;

FIG. 9 is a side elevation partly in section of the apparatus components shown in FIG. 8;

FIG. 10 is a vertical sectional view taken along the line 10—10 of FIG. 1 enlarged to show the coaxially journaled tubes, support sleeve and sleeve mounting plate;

FIG. 11 is a vertical sectional view taken along the line 11—11 of FIG. 1 showing the means for actuating the emulsion cut-off tube;

FIG. 12 is a schematic representation of an embodiment of a control system for sequentially operating the stuffing, clipping and severing elements of the apparatus shown in FIGS. 1 and 3 to 11;

FIG. 13 is a schematic representation of portions of the apparatus of FIG. 1 showing modes of operation for controlling the shape of the leading end of the stuffed product;

FIG. 14 is a schematic representation of the apparatus of FIG. 1 showing modes of operation for controlling the size of the stuffed product;

FIG. 15 is a schematic representation of the apparatus of FIG. 1 showing modes of operation for controlling the shape of the trailing end of the stuffed product;

FIG. 16 is a vertical section taken generally along line 16—16 of FIG. 1 showing the subframe and operating elements mounted thereon; and FIG. 17 is a schematic view to be used in conjunction with 12 to show an embodiment of a sequential synchronizing means for use in the sequential operation of the stuffing, closing and severing cycle of the apparatus of FIG. 1 along with the showing of the sensing and control means of this invention.

DETAILED DESCRIPTION OF THE DRAWINGS

In FIG. 1 there is shown a stuffing apparatus wherein reference numeral 10 generally represents a frame which is capable of accommodating the various components of the apparatus. The frame provides an aft end 14 which supports components of the apparatus closest to the supply of food product hereinafter called emulsion, and a fore end 12 which accommodates the components of the apparatus servicing the tubular casing during stuffing. Demountably secured to the frame 10 towards its aft end 14 is a stuffing horn assembly 16 which includes a central support tube 18 of generally cylindrical configuration and which extends longitudinally from the aft end 14 of the frame towards the fore end 12. The central support tube 18 has an inlet end 20 disposed at the aft end 14 of the frame 10 which is detachably secured to a source of pressurized emulsion (as shown in FIG. 12) and is further provided with a tapered plug 22 which is adapted to streamline the emulsion directed through support tube 18 to discharge port 24. The central support tube is demountably secured onto shouldered boss 26 of frame 10 near its inlet end 20.

As best seen in FIGS. 1 and 7 the discharge port 24 of central support tube 18 is of generally semicircular configuration as formed by tapered plug 22, and cooperates with emulsion cut-off means (in a manner as explained hereafter) to control the passage of emulsion through the discharge port 24.

The stuffing horn assembly 16 also includes emulsion cut-off tube 28 which is concentrically disposed and rotatably trunnioned on central support tube 18 at the end adjacent discharge port 24 and at the other end in bushings 30 of boss 26. Thus, as so constructed and arranged, emulsion cut-off tube 28 is adapted to rotate about the longitudinal axis of central support tube 18, the latter remaining in fixed relation with respect to frame 10.

Situated adjacent the discharge port 24 of central support tube 18 is the outlet end 32 of emulsion cut-off tube 28. As best seen from FIGS. 1, 3 and 7, the outlet end 32 has an end wall 34 which is provided with a semicircular cut-off orifice 36 adapted to be in registering alignment with discharge port 24 of central support tube 18 upon appropriate rotation of the emulsion cut-off tube 28.

In operating position, emulsion cut-off tube 28 is disposed in a manner such that discharge port 24 is in registering alignment with cut-off orifice 36 thereby permitting pressurized emulsion to pass therethrough. In non-operating or closed position, emulsion cut-off tube 28 has been rotated through 180° and in this position, cut-off orifice 36 is in alignment with tapered plug 22, and discharge port 24 is adjacent end wall 34 of emulsion cut-off tube 28 preventing further flow of emulsion.

The appropriate rotation of emulsion cut-off tube 28 is effected by a pneumatic motor and pulley means through control means later described. Referring particularly to FIGS. 1 and 11, the end of emulsion cut-off tube 28 facing the aft end 14 of the frame 10 has pulley 38 secured thereto and is coupled by timing belt 40 to pulley 42 driven by a pneumatic motor 44 which rotates emulsion cut-off tube 28 to the operating or non-operating positions.

The stuffing horn assembly 16 also includes a support sleeve 46 generally shown in FIGS. 1, 3 and 10 which is slideably journaled on emulsion cut-off tube 28. The support sleeve is capable of limited, controlled movement either towards or away from the aft end of the apparatus.

Thus, the aft end of support sleeve 46 terminates in mounting plate 48 as shown in FIGS. 1 and 10, which is secured to rod 50 of pneumatic cylinder 52 mounted on frame 10. As best seen in FIG. 1, fore and aft movement of the support sleeve 46 is effected by pneumatic cylinder 52 and is limited by aft end adjustable stop 54 and fore end adjustable stop 56.

Figure 2:
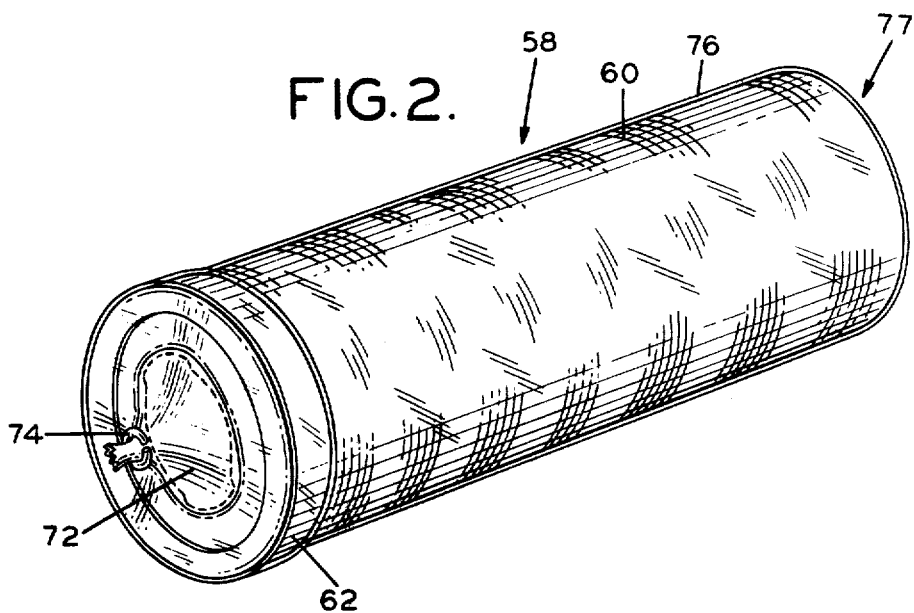
FIG. 2 is a perspective illustrating the prepackaged shirred casing article used on the apparatus shown in FIG. 1.

The support sleeve 46 is adapted to accommodate and detachably secure a shirred tubular casing article having a casing sizing means confined within a deshirred or unshirred portion of the tubular casing. The shirred tubular casing article for use in the present invention is depicted in FIG. 2 of the drawing and is disclosed in the copending application of John H. Beckman, Ser. No. 627,253 having a common assignee and which was filed concurrently herewith, the disclosure of which is incorporated herein by reference. In general, however, and referring again to FIG. 2, the shirred tubular casing article 58 includes a shirred casing length 60 such as a 150 foot length of Union Carbide Corporation's No. 6 fibrous casing compacted to a length of about 2 feet. The materials from which the casing lengths are manufactured can typically be films fabricated from unsupported or fibrous reinforced cellulose, polyvinylidene chloride, polyvinylchloride, polyesters, collagen, and polyolefins such as polyethylene or any other suitable material.

As mentioned previously, the casing length can be shirred with the apparatus and process disclosed in U.S. Pat. Nos. 2,983,949 and 2,984,574 to Matecki with compression ratios of about 40:1 and up to 100:1.

The shirred tubular casing article 58 also includes a sizing disc 62 of generally annular configuration and which is provided with a central opening defining an inner diameter of the sizing disc 62 which is slightly larger than the diameter of shoulder 66 at the fore end of support sleeve 46 (FIGS. 3, 8 and 9). The sizing disc 62 can be fabricated from any material capable of withstanding the stresses imposed upon it during operation. Merely as illustrative, the sizing disc 62 can be fabricated from a metal such as stainless steel or a plastic such as polyethylene, nylon, polytetrafluoroethylene, and like materials.

The sizing disc 62 is provided with slot elements which coact with mating locking elements on support sleeve 46 to lock or secure the shirred tubular casing article 58 to the support sleeve 46. One form of locking means is shown in FIGS. 3, 8 and 9 and includes a disc aperture 64 having a slide fit for shoulder 66 disposed at the fore end of support sleeve 46. Disc aperture 64 is provided with disc aperture recesses 68 which are adapted to be mated with retaining shoulder or lug elements 70 fixedly mounted on support sleeve 46. Thus by urging disc aperture recesses 68 into mating relationship with retaining shoulder portions 70 and thereafter twisting the sizing disc 62, a bayonet or twist type locking or securing means is provided, thereby securing the shirred tubular casing article 58 to the support sleeve 46.

As shown in FIG. 2, the shirred tubular casing article 58 also includes a deshirred or unshirred portion 72 of casing length 60 which envelopes the sizing disc 62 and is clip closed with a leading end metal clip 74. The shirred tubular casing article 58 also includes a film overwrap 76, preferably of a flexible synthetic polymeric material which protects and retains the shirred casing length 60 during shipment and the securing of it onto support sleeve 46. The shirred tubular casing article 58 can be mounted on support sleeve 46 by inserting the open end 77 of shirred tubular casing article (shown in FIG. 1) over the support sleeve 46 and securing the sizing disc thereto as explained previously. The film overwrap 76 can then be removed for stuffing the casing length.

Associated with the stuffing horn assembly is a snubbing carriage 78 which is cyclically adapted to be advanced toward and retracted from the stuffing horn assembly 16. The snubbing carriage 78 provides elements which function to clip and sever the finished product and further provides restraining means in combination with sizing disc 62 for snubbing and thereby restraining the deshirred casing length during the filling operation.

Referring to FIGS. 1 and 16, the snubbing carriage 78 is shown slideably mounted on subframe 80 and is capable of longitudinal and transverse directional movement with respect to the stuffing horn assembly 16. Longitudinal or fore and aft end directional movement of snubbing carriage 78 can be provided by means of strut 82 projecting from slide bearings 84, 84' which are integrally associated with snubbing carriage 78 and which are slideably mounted on slide rods 86, 86'. Pneumatic cylinder 88 accommodates a piston rod 90, one end of which is secured to strut extension 92 of strut 82. Activation of pneumatic cylinder 88 causes either fore or aft end movement of piston rod 90 thereby providing fore or aft end movement of snubbing carriage 78 which further permits the functions of the remaining snubbing carriage closure element to be sequentially performed. Thus as best seen from FIGS. 1, 3, 4 and 5 snubbing carriage 78 mounts an annular ring 94 which defines a central opening having an inner circumference slightly larger than the circumference of the fore end of emulsion cut-off tube 28.

Mounted on strut 82, athwart annular ring 94 is a pair of pneumatically operated conventional casing gathering and clip closing devices i.e., a leading end clip closing device 96 and a trailing end clip closing device 98. A severing knife 100, for severing the clip closed product is adapted to be advanced into slot 102 of annular ring 94. Movement of severing knife 100 is sequentially timed by means of control elements activating pneumatic cylinder 104 to which the severing knife 100 is connected.

As will be evident from the foregoing description, activation of pneumatic cylinder 88 advances or retracts carriage 78 and with it annular ring 94 and clipping elements 96, 98 and severing means 100. Thus annular ring 94 can be advanced coaxially over stuffing horn assembly 16 or retracted distally therefrom.

Lateral movement of snubbing carriage 78 slideably mounted on subframe 80 can be accomplished when retracted distally from horn assembly 16. As best seen in FIG. 16, subframe 80 is manually laterally movable on slide rods 106, 106' secured at each end to frame members 108 having end portions secured to frame 10.

After completely stuffing a shirred casing, the used sizing disc 62 can be removed and a new shirred tubular casing article 58 can be inserted onto the support sleeve 46 by laterally retracting the snubbing carriage 78 from the axis of stuffing horn assembly 16, thereby permitting positioning and securing a new sizing disc 62 in the casing article onto sleeve 46. Snubbing carriage 78 is then advanced on subframe 80 to the axis of stuffing horn assembly 16 in preparation for the automatic stuffing operation shown in FIGS. 1 and 3.

Referring again to FIG. 1, situated at the fore end of frame 10 is a pivoted product conveyor 110 which supports the stuffed casing as it is progressively filled with food emulsion and advanced from the discharge port 24 of central support tube 18. The product coneyor 110 includes a frame 112 having a plurality of transverse rollers 114 spaced longitudinally and arranged to roller support the stuffed casing. Frame 112 is pivotally fastened to frame 10 by hinges 113. A product stop switch 116 is adjustably fastened to slide angle 115 secured to frame 10 and is adapted to sense the fore end of a stuffed product to terminate a stuffing operation as will be described below.

In accordance with this invention, there is provided a casing sensing means for detecting the depletion of shirred lengths on the stuffing horn, such as may be employed in the apparatus of U.S. Pat. No. 3,975,795 filed in the name of Vytautus Kupcikevicius et al., and Ser. No. 627,252 in the name of Vytautus Kupcikevicius et al., filed concurrently with this application.

The sensing means comprises a casing tab gripper 118 that is fastened to an extension of plate 48 of support sleeve 46 and is positioned to releasably grip a portion of the shirred tubular casing article 58, such that before the shirred tubular casing length 60 has been entirely depleted, signal means anticipates and interrupts the automatic stuffing cycle of the apparatus as will be described below in conjunction with FIGS. 12 and 17.

The operation of the illustrated apparatus is shown sequentially in the drawing, FIGS. 1, 4, 5 and 6. The loading and preparation mode includes priming the central support tube 18 with emulsion; loading the shirred tubular casing article 58 on the support sleeve 46; gathering and clipping the casing after interruption of an automatic stuffing operation; making any indicated minor adjustment of product size diameter; and adjusting to shape the fore and aft end configurations of the shirred tubular casing article.

Referring specifically to FIG. 12, in order to manually load the apparatus of the invention with the prepackaged shirred tubular casing article 58, snubbing carriage 78 is retracted axially distally from stuffing horn assembly 16 and is then laterally retracted transversely from the axis of central support tube 18. The open end 77 of article 58 is placed onto support sleeve 46 and a short length or tab is deshirred and clamped into a casing sensing device 118 by means of a conventional toggle clamp device. It should be understood that other type sensing means could be employed as element 118 for sensing movement of a portion of shirred casing, as, for example, optical sensing means, tactile sensing means, and means employing the casing materials as an insulator separating electrical contacts. The sizing disc 62 is twist locked onto sleeve 46 and with the shirred casing 60 releasably secured to sleeve 46, snubbing carriage 78 is manually returned to the axis of central support tube 18 and the clip closed shirred casing is now in condition for starting the automatic stuffing operation.

The operation of the apparatus of U.S. Pat. No. 3,975,975 and Ser. No. 627,252 noted above, principally employs pneumatic motive means for the operating and control elements of the apparatus. Operation and control of such apparatus can also employ electro/pneumatic or electrical motive means.

As shown schematically in FIG. 17, a plurality of motor driven cam operated timing switches can be used to control the sequential operation of stuffing, closing and severing of the casing. In FIG. 17, timing switch 3 generally controls the stuffing formation and shape of the fore end of the product; timing switch 21 controls the stuffing formation and shape of the aft end, and application of the aft end clip to the product; timing switch 39 generally controls indexing of the snubbing carriage, application of the fore end clip and casing severing means; and timing switch 57 controls the modification of the functioning of switches 3, 21 and 39 when the casing depletion sensor 118 is tripped.

The automatic stuffing operation is initially begun by depressing a start button shown schematically in FIG. 12 thereby indexing snubbing carriage 78 to the aft end of the apparatus where it trips starting switch 128 starting timing switch 3. As shown in FIG. 17, starting switch 128 actuates motor M1 which in turn starts rotating the shaft of timing switch 3. Cam member 5 of switch 3 triggers switch 7 to initiate the stuffing cycle by actuating a pneumatic valve (not shown) to pressurize pneumatic cylinder 52 via conduit 61, to retract sleeve 46 and sizing disc 62 to the aft end of the apparatus, thus deshirring a predetermined length of casing. In timed sequence immediately thereafter, cam member 9 of timing switch 3, triggers switch 11 which actuates of the pneumatic valve to pressurize pneumatic cylinder 52 in the reverse direction via conduit 63, thereby advancing sleeve 46 and sizing disc 62 to the stuffing station so that a controlled shaped leading end can be produced. Immediately upon advancing sleeve 46 and sizing disc 62 toward the stuffing station, cam members 13 and 17 of timing switch 3 trigger switches 15 and 19, respectively, with the former actuating switch 130 into a closed state to thereby energize emulsion pump 132, while the latter actuates valve 160 to thereby energize pneumatic motor 44. Motor 44 then rotates emulsion cut-off tube 28 to align discharge port 24 with orifice 36 (FIGS. 3 and 7), thereby allowing pressurized emulsion to stuff the initially deshirred portion of casing length 72 and then continue to deshirr and stuff the remaining casing.

The length of casing initially deshirred at the beginning of the stuffing cycle is predetermined by the setting of adjustable stop 54 adapted to arrest the retraction of support sleeve 46. When adjustable stop 54 is adjusted to provide a relatively long retracted length, a hemispherical stuffed leading end F configuration results as shown in FIG. 13 as F' (dash line). If a tightly stuffed leading end configuration is desired as shown in FIG. 13 as F'' (solid line), adjustable stop 54 is adjusted for providing a relatively short length of deshirred casing. Cams 5, 9, 13, 17 of timing switch 3 can be adjusted with respect to each other to regulate the timing cycle, and the adjustment of deshirred casing length can be employed in different combinations to produce various leading end configurations for stuffed casings.

The emulsion under pressure shapes the leading end F and continues to fill the casing length to a controlled diameter by withdrawing the leading end of the casing over sizing disc 62. Referring to FIG. 14, pneumatic cylinder 52 has advanced disc 62 mounted on support sleeve 46, to the variable stuffing position determined by adjustable stop 56, which controls the distance L between the face 62b of sizing disc 62 and the face 94b of annular ring 94. A combination of the adjustable distance L (FIG. 14) and the predetermined diameter of sizing disc 62 controls the snubbing or braking force on the deshirred casing as it is advanced and stretched over surface 62a of sizing disc 62 and then infolded through annular ring 94. The sizing disc 62 provides primary control for the diameter size of the stuffed product by stretching and sizing the casing being deshirred, while control of distance L provides a vernier or fine adjustment for the diameter size so as to provide uniform stuffing of the casing from end to end. When the distance L is short as shown on FIG. 14 as $L^x$, the casing is tightly snubbed and abruptly infolded between disc 62 and annular ring 94 thereby providing a uniform diameter $D^x$ (dash line, FIG. 14) slightly larger than the size of the conventional stuffing diameter recommended by casing manufacturers. When the distance L is long as shown on FIG. 14 as $L^y$, the casing is less tightly snubbed and more gradually infolded as it passes over surface 62a of sizing disc 62 and through annular ring 94, thereby providing a uniform diameter $D^y$ (solid line, FIG. 14). This diameter in the extreme vernier setting may be slightly less than the conventional stuffing diameter size recommended by casing manufacturers.

The leading end of the stuffed product has now been selectively formed and the diameter D controlled. As shown in FIGS. 12 and 17, when the stuffed product has reached the desired length, it trips product length control switch 138 adjustably secured on slide angle 115. This triggers a signal which reverses motor M1, thereby returning the timing switch 3 to its initial state and at the same time the signal actuates motor M2 which controls timing switch 21. Since timing switch 3 has been returned to its initial inoperative state, switch 130 is opened, thereby deenergizing emulsion pump 132 and simultaneously rotating emulsion cut-off tube 28 to close the discharge port 24, thereby stopping the discharge of emulsion into the casing.

Cam member 23 of timing switch 21 immediately triggers switch 25 which in turn actuates a pneumatic valve (not shown) to pressurize pneumatic cylinder 52 via conduit 61 to retract sleeve 46 and sizing disc 62 to the aft end of the apparatus, thus deshirring a predetermined length of casing. As shown in FIG. 12, adjustable stop 54 controls the length of casing to be deshirred and when said length is obtained, cam member 27 of timing switch 21 immediately triggers switch 29 which actuates a pneumatic valve to pressurize pneumatic cylinder 52 in the reverse direction via conduit 63, thereby advancing sleeve 46 and sizing disc 62 to the fore end of the apparatus, and the deshirred length of casing is thereby released from tension. Immediately thereupon, cam member 31 triggers switch 33 which in turn actuates a pneumatic valve (not shown) for advancing trailing end pneumatic cylinders 142 and 142' via conduits 141 and 141' respectively, thereby gathering the trailing end of the stuffed casing and applying a trailing end clip closure as shown in FIG. 5. The length of casing deshirred at the trailing end of a stuffed product is predetermined by a setting of adjustable stop 54 which is adapted to arrest the retraction of support sleeve 46. However, since the length of the stroke of pneumatic cylinder 52 which is activated during closing of the trailing end of a stuffed product is equal to the stroke during formation of the leading end of the stuffed product because the same adjustable stop 54 is used, then usually no adjustment to the stroke length would be made during the stuffing time portion of the cycle.

As described above, when the product length control switch 138 is tripped, piston rod 50 of pneumatic cylinder 52 is retracted to the aft end direction of the apparatus and then advanced to the fore end providing a deshirred length of casing, and cylinders 142 and 142' are pressurized to gather the trailing end of the casing and apply a trailing end clip thereat. When the adjustable stop 54 is adjusted to provide a relatively short stroke via action of pneumatic cylinder 52, a tight trailing end A results as shown in FIG. 15 as A' (solid line). When adjustable stop 54 is adjusted to provide a relatively long stroke via action of pneumatic cylinder 52, then a slack stuffed trailing end results as shown in FIG. 15 as A" (dash line). The adjustment of the cam timing cycle and adjustment of deshirred casing length can be employed in different combinations to produce various trailing end configurations for stuffed products.

With pneumatic cylinders 142 and 142' in the advanced position, thereby restraining the gathered trailing end casing in clip closure, cam member 35 of timing switch 21 triggers switch 37 which in turn actuates a pneumatic valve (not shown) to retract pneumatic cylinder 88 via conduit 87, thereby indexing snubbing carriage 78 to the fore end of the apparatus until it trips limit swtich 146. As shown in FIG. 17, the limit switch 146 actuates motor M3 to rotate the shaft of timing switch 39, thereby activating cam member 41 which triggers switch 43 to actuate a pneumatic valve (not shown) to pressurize fore end clipping cylinders 148 and 148' via conduits 147 and 147', respectively, thereby gathering the fore end of the succeeding unfilled casing and applying a fore end clip closure as shown in FIG. 6. With pneumatic cylinders 142, 142', 148 and 148' in the advanced position restraining the casing at the aft and fore end closure points as shown in FIG. 6, cam member 45 triggers switch 47 which in turn actuates a pneumatic valve (not shown) to pressurize single acting spring return pneumatic cylinder 104 via conduit 103 for advancing severing knife 100 to sever the casing between the fore and aft clip closures. After the cam member 45 has held switch 47 closed for a time sufficient to complete severing of the casing, cam members 41, 45 and 49 inactuate and open switches 43, 47 and 51, respectively. Switch 43 in turn reverses the pressure on pneumatic cylinders 148 and 148' via conduits 149 and 149', respectively, thereby retracting the leading end clip device 96–96'. Simultaneously, switch 47 in turn reverses, thereby releasing the pressure on single acting spring return pneumatic cylinder 104 to thereby retract severing knife 100, and switch 51 in turn reverses the pressure on pneumatic cylinders 142 and 142' via conduits 143 and 143', respectively, thereby retracting the trailing end clip device 98–98'. Following inactivation of switches 43, 47 and 51, cam 53 is designed to trigger switch 55 which in turn actuates the pneumatic valve to advance pneumatic cylinder 88 via conduit 89, thereby advancing carriage 78 proximal to the cut-off tube 28 to repeat the stuffing cycle. Automatic recycling of the apparatus is halted when switch 55 is opened.

The casing depletion sensing device 118 is used to sense depletion of casing 60 supply and then open switch 55, thereby stopping the automatic recycling of the apparatus. If switch 55 is not opened by sensing device 118, carriage 78 is advanced toward the stuffing station where it trips starting switch 128 to repeat the stuffing, closing and severing cycle again as described above. When the snubbing carriage 78 is advanced to the stuffing station, it causes an interlock valve 158 to be opened thus pressuring a cylinder (not shown) connected to frame 112, to tilt conveyor 110 about hinges 113 and thereby remove the stuffed product from the rollers 114 of product conveyor 110. Removal of the product resets the product length control switch 138 to sense the leading end of the next stuffed product.

The casing sensing means of the present invention is shown in FIGS. 1 and 12 as element 118. When movement of the trailing end portion of casing 60 is sensed by element 118, a signal is triggered which actuates control means comprising rotary switch 57. The signal from sensor 118 actuates motor M4 to rotate the shaft of timing switch 57 thereby activating cam member 59 which triggers switch 61 and produces a signal to actuate motor M2 and thereby timing switch 21. Timed to be simultaneous with actuation of motor M2, cam member 63 on rotary switch 57 is set to trigger switch 65 which produces a signal to inactivate motor M1 on rotary switch 3, thereby causing cams 13, 17 to close discharge port 24 of tube 28 and deenergizing emulsion pump 132. These control signals from sensor 118 via motor M4 are similar to the signals transmitted from product length control switch 138.

Although the emulsion flow is stopped, motor M2 continues to control the sequence of timing switch 21 until switch 37 indexes carriage 78 distally from tube 28 to trip switch 146. Switch 146 starts motor M3 of timing switch 39 controlling switches 43, 47, 51 thereby providing an aft end and a fore end closure for the succeeding casing and the severing of the casing of the last stuffed product to be filled.

When the casing depletion sensing device 118 has been tripped and the automatic cycling of the stuffing/clipping operation has been interrupted as described above, the device 118 is reset to reestablish automatic operation. With the device 118 in the tripped position, switch 65 on rotary switch 57 continues to inactivate rotary switch 3 and thus prevents automatic recycling. Switch 65 is then reset when sensing device 118 is reset.

When it is desired to terminate the stuffing operation by the casing runout sensing means 118, without applying the fore end clip to the succeeding terminal length of casing, the above described control sequence is modified to lock out the final steps of applying the fore end clip closure 74 and the indexing of carriage 78 proximal to the cut-off tube 28. This mode of control can be accomplished by having switch 65 inactuate switches 43 and 55, thereby disabling the fore end clipping and the carriage 78 indexing functions as shown by the dashed line in FIG. 12 between switch 57 and switch 39.

The control sequence can be also further modified by inactuating switch 47 thereby inactivating the casing severing means 104. As disclosed above, the casing runout sensing means 118 can be disposed to detect casing movement upstream of the trailing end of the casing for specific applications such as to insure that the last fully stuffed product will be of proper predetermined length.

In applications where it is desirable to use effectively all of the casing, a variable time delay can be incorporated into the second control means associated with the sensing means to terminate the stuffing/closing operation before the casing is completely expended. Typically a conventional variable time delay 169 (FIG. 17) can be coupled to switch 61 of rotary switch 57 or the cams 59 and 63 could be displaced counterclockwise on the shaft to delay activation of rotary switches 21 and 3 until a preselected time interval has elapsed to anticipate the runout of a casing length shorter than the desired length of product without the fore end of the stuffed product reaching and tripping the length control switch 138.

It should be apparent from the above description of the invention that the sensing means could be used to trigger a signal to interrupt any portion of the stuffing, closing and severing cycle of the stuffing apparatus. It should also be evident that the sensing and control means of this invention can be used with any stuffing apparatus that produces strands of inter-connected product links having selectively either a single clip closure or spaced double clip closure intermediate the links, individual stuffed products or any other arrangement of stuffed products that are produced on a continuous basis, since the sensing and control means can be employed to produce a signal to interrupt any part of the overall stuffing operation so as to terminate the flow of product from the stuffing horn before the shirred tubing is completely expended or depleted.

It is to be understood that the invention can be used with various stuffing apparatus to encase products of viscous material, such as fats, cheese, ice cream, scrapple, ground fresh meat products, as well as lard, oleomargarine explosives, and other products normally stuffed into casings. Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. In an apparatus for stuffing flowable product into shirred casing comprising a stuffing horn assembly adapted for mounting a shirred tubular casing, and including a tube having an inlet end for receiving flowable product from a pressurized supply and a discharge end for discharging the product; product stoppering means adapted to be indexed to a first position so as to allow the passage of pressurized product out through the discharge end of the tube into a mounted shirred casing and adapted to be indexed to a second position so as to prevent the flow of pressurized product out through said discharge end of the tube; means associated with said stuffing horn assembly and adapted for providing a closure after a selected length of casing is stuffed; and first control means for automatically providing consecutive cycles of a stuffing and closing operation for producing stuffed products of a desired length; the improvement comprising sensing means adapted to detect movement of a trailing end portion of a mounted shirred casing, and second control means associated with said sensing means for interrupting the stuffing and closing operation so as to terminate the flow of product from the tube before the mounted shirred casing is completely expended.

2. In the apparatus of claim 1 wherein the means associated with the stuffing horn assembly is adapted for providing a closure at an aft end of a length of stuffed casing, providing a closure at the fore end of the succeeding trailing unfilled casing thereof and providing severing of the casing intermediate the aft and fore end closures, and wherein the second control means associated with said sensing means is adapted for interrupting the stuffing, closing and severing operation upon detection of movement of the trailing end portion of a mounted shirred casing being filled so as to terminate the flow of product from the tube before the shirred casing is completely expended.

3. The apparatus of claim 1 wherein the sensing means is positioned to sense movement of the casing a predetermined distance from the trailing end of the mounted shirred casing.

4. The apparatus of claim 2 wherein the sensing means is positioned to sense movement of the casing a predetermined distance from the trailing end of the mounted shirred casing.

5. The apparatus of claim 1 wherein the sensing means is adapted for detecting movement of a mounted shirred casing a fixed distance upstream of the trailing end of said shirred casing.

6. The apparatus of claim 2 wherein the sensing means is adapted for detecting movement of a mounted shirred casing a fixed distance upstream of the trailing end of said shirred casing.

7. The apparatus of claim 1 wherein a timing delay means is added for delaying the actuation of the second control means after the sensing means detects movement of the trailing end portion of a mounted shirred casing.

8. The apparatus of claim 2 wherein a timing delay means is added to the sensing means for delaying the actuation of the second control means after the sensing means detects movement of the trailing end portion of a mounted shirred casing.

9. A method for automatically terminating the flow of product through a stuffing horn assembly prior to complete expenditure of a shirred casing on said stuffing horn assembly which comprises:
  a. sheathing a shirred casing onto a horn of a stuffing horn assembly, said horn having an inlet end and a discharge end, and the fore end of the casing proximal the discharge end of the horn being closed;
  b. releasing a pressurized flowable product from the discharge end of said horn, thereby deshirring the casing and progressively stuffing said casing;
  c. stopping the flow of pressurized material after a predetermined length of casing has been stuffed;
  d. applying a closure at the aft end of said stuffed casing;
  e. repeating the releasing step (b), the stopping step (c) and the applying a closure step (d); and
  f. automatically sensing movement of the trailing portion of the shirred casing on the horn of the stuffing horn assembly and interrupting the sequence of the releasing step (b), the stopping step (c) and the applying a closure step (d) by terminating the flow of product from the discharge end of the horn before the shirred casing is completely expended.

10. The method of claim 9 wherein after the sheathing step (a) and before releasing step (b) the following step is added:
  a'. deshirring a portion of the closed end region of the shirred casing.

11. The method of claim 9 wherein after the stopping step (c) and before the applying a closure step (d) the following step is added:
  c'. advancing the stuffed casing from the discharge end of said stuffing horn to a closure station.

12. The method of claim 9 wherein in the sensing step (f) the sensing of movement of the trailing portion of the shirred casing on the horn of the stuffing horn assembly interrupts the sequence of the releasing step (b), the stopping step (c) and the applying a closure step (d) by implementing and maintaining the stopping step (c), thereby terminating the flow of product from the discharge end of the horn before the shirred casing is completely expended, while proceeding with the applying a closure step (d).

13. The method of claim 11 wherein in the sensing step (f) the sensing of movement of the trailing portion of the shirred casing on the horn of the stuffing horn assembly interrupts the sequence of the releasing step (b), the stopping step (c) and the applying a closure step (d) by implementing and maintaining the stopping step (c), thereby terminating the flow of product from the discharge end of the horn before the shirred casing is completely expended, while proceeding with the advancing step (c') and the applying a closure step (d).

14. A method for automatically terminating the flow of product through a stuffing horn assembly prior to complete runout of shirred casing on said stuffing horn assembly which comprises:
  a. sheathing a shirred casing onto a horn of a stuffing horn assembly, said horn having an inlet end and a discharge end, and the fore end of the casing proximal the discharge end of the horn being closed;
  b. releasing a pressurized flowable product from the discharge end of said horn, thereby deshirring the casing and progressively stuffing said casing;
  c. stopping the flow of pressurized material after a predetermined length of casing has been stuffed;
  d. advancing the stuffed casing from the discharge end of said stuffing horn to a closure station;
  e. applying a closure at the aft end of said stuffed casing and a closure at the fore end of the succeeding trailing unfilled casing at the closure station;
  f. severing said stuffed closed end casing intermediate said aft end closure and said fore end closure of the succeeding trailing unfilled casing;
  g. repeating the releasing step (b), the stopping step (c), the advancing step (d), the applying a closure step (e) and the severing step (f); and
  h. automatically sensing movement of the trailing portion of the shirred casing on the horn of the stuffing horn assembly and interrupting the sequence of releasing step (b), the stopping step (c), the advancing step (d), the applying a closure step (e) and the severing step (f) by terminating the flow of product from the discharge end of the horn before the shirred casing is completely expended.

15. The method of claim 14 wherein in the sensing step (h) the sensing movement of the trailing portion of shirred casing on the horn of the stuffing horn assembly interrupts the sequence of the releasing step (b), the stopping step (c), the advancing step (d), the applying a closure step (e) and the severing step (f) by implementing and maintaining the stopping step (c), thereby terminating the flow of product from the discharge end of the horn before the shirred casing is completely expended, while proceeding with the advancing step (d) and the severing step (e).

16. The method of claim 14 wherein after the sheathing step (a) and before the releasing step (b) the following step is added:
  a'. deshirring a portion of the closed end region of the shirred casing.

17. The method of claim 15 wherein in the sensing step (h) after implementing and maintaining the stopping step (c), the advancing step (d), the applying a closure step (e) and the severing step (f) proceed to completion.

18. The method of claim 17 wherein after the sheathing step (a) and before the releasing step (b) the following step is added:
  a'. deshirring a portion of the closed end region of the shirred casing.

19. A method for automatically terminating the flow of product through a stuffing horn assembly prior to complete runout of shirred casing on said stuffing horn assembly which comprises:
  a. sheathing a shirred casing onto a horn of a stuffing horn assembly, said horn having an inlet end and a discharge end, and the fore end of the casing proximal the discharge end of the horn being closed;
  b. releasing a pressurized flowable product from the discharge end of said horn, thereby deshirring the casing and progressively stuffing said casing;

c. stopping the flow of pressurized material after a predetermined length of casing has been stuffed;

d. applying a closure at the aft end of said stuffed casing;

e. advancing the closed end of the stuffed casing to a closure station;

f. applying a closure at the fore end of the succeeding trailing unfilled casing at the closure station;

g. severing said stuffed closed end casing intermediate said aft end and said fore end of the succeeding trailing unfilled casing;

h. repeating the releasing step (b), the stopping step (c), the applying an aft closure step (d), the advancing step (e), the applying a fore closure step (f) and the severing step (g); and i. automatically sensing movement of the trailing portion of the shirred casing on the horn of the stuffing horn assembly and interrupting the sequence of the releasing step (b), the stopping step (c), the applying an aft closure step (d), the advancing step (e), the applying a fore closure step (f) and the severing step (g) by terminating the flow of product from the discharge end of the horn before the shirred casing is completely expended.

20. The method of claim 19 wherein in the sensing step (i) the sensing of movement of the trailing portion of shirred casing on the horn of the stuffing horn assembly interrupts the sequence of the releasing step (b), the stopping step (c), the applying an aft closure step (d), the advancing step (e), the applying a fore closure step (f) and the severing step (g) by implementing and maintaining the stopping step (c), thereby terminating the flow of product from the discharge end of the horn before the shirred casing is completely expended, while proceeding with the applying an aft closure step (d).

21. The method of claim 20 wherein in the sensing step (i) after implementing and maintaining the stopping step (c), the applying an aft closure step (d), the advancing step (e), the applying a fore closure step (f) and the severing step (g) proceed to completion.

22. The method of claim 20 wherein after the sheathing step (a) and before releasing step (b) the following step is added:

a'. deshirring a portion of the closed end region of the shirred casing.

23. The method of claim 22 wherein in the sensing step (i) after implementing and maintaining the stopping step (c), the applying an aft closure step (d), the advancing step (e), the applying a fore closure step (f) and the severing step (g) proceed to completion.

24. A method for automatically terminating the flow of product through a stuffing horn assembly prior to complete runout of shirred casing on said stuffing horn assembly which comprises:

a. sheathing a shirred casing onto a horn of a stuffing horn assembly, said horn having an inlet end and a discharge end, and the fore end of the casing proximal the discharge end of the horn being closed;

b. releasing a pressurized flowable product from the discharge end of said horn, thereby deshirring the casing and progressively stuffing said casing;

c. stopping the flow of pressurized material after a predetermined length of casing has been stuffed;

d. advancing the stuffed casing to a closure station;

e. applying a closure at the aft end of said stuffed casing;

f. applying a closure at the fore end of the succeeding trailing unfilled casing at the closure station;

g. severing said stuffed closed end casing intermediate said aft end and said fore end closure of the succeeding trailing unfilled casing;

h. repeating the releasing step (b), the stopping step (c), the advancing step (d), the applying an aft closure step (e), the applying a fore closure step (f) and the severing step (g); and i. automatically sensing movement of the trailing portion of the shirred casing on the horn of the stuffing horn assembly and interrupting the the sequence of the releasing step (b), the stopping step (c), the advancing step (d), the applying an aft closure step (e), the applying a fore closure step (f) and the severing step (g) by terminating the flow of product from the discharge end of the horn before the shirred casing is completely expended.

25. The method of claim 24 wherein in the sensing step (i) the sensing of movement of the trailing portion of shirred casing on the horn of the stuffing horn assembly interrupts the the sequence of the releasing step (b), the stopping step (c), the advancing step (d), the applying an aft closure step (e), the applying a fore closure step (f) and the severing step (g) by implementing and maintaining the stopping step (c), thereby terminating the flow of product from the discharge end of the horn before the shirred casing is compeltely expended, while proceeding with the advancing step (d) and the applying an aft closure step (e).

26. The method of claim 25 wherein in the sensing step (i) after implementing and maintaining the stopping step (c), the advancing step (d), the applying an aft closure step (e), the applying a fore closure step (f), and the severing step (g) proceed to completion.

27. The method of claim 24 wherein after the sheathing step (a) and before the releasing step (b) the following step is added:

a'. deshirring a portion of the closed end region of the shirred casing.

28. The mothod of claim 27 wherein in the sensing step (i) after implementing and maintaining the stopping step (c), the advancing step (d) and the applying an aft end closure step (e) proceed to completion.

29. The method of claim 28 wherein in the sensing step (i) after implementing and maintaining the stopping step (c), the advancing step (d), the applying an aft closure step (e), the applying a fore closure step (f), and the severing step (g) proceed to completion.

* * * * *